United States Patent [19]

Manduley

[11] Patent Number: 5,648,916
[45] Date of Patent: Jul. 15, 1997

[54] INTERNAL MAIL DISTRIBUTION SYSTEM

[75] Inventor: Flavio M. Manduley, Woodbury, Conn.

[73] Assignee: Pitney Bowes Inc., Stamford, Conn.

[21] Appl. No.: 513,469

[22] Filed: Aug. 10, 1995

[51] Int. Cl.$^6$ .................... G06F 19/00; G07B 17/00
[52] U.S. Cl. ................ 364/514 A; 364/400; 364/464.11
[58] Field of Search .................. 364/464.02, 514 A, 364/400, 464.11; 395/200.01, 200.02, 200.15, 761, 792

[56] References Cited

U.S. PATENT DOCUMENTS

| | | | |
|---|---|---|---|
| 5,265,033 | 11/1993 | Vajk et al. | 364/514 C |
| 5,473,143 | 12/1995 | Vak et al. | 235/380 |
| 5,513,126 | 4/1996 | Harkins et al. | 364/514 A |
| 5,530,740 | 6/1996 | Irribarren et al. | 379/89 |
| 5,557,752 | 9/1996 | Remion | 395/200.15 X |

*Primary Examiner*—Edward R. Cosimano
*Attorney, Agent, or Firm*—Ronald Reichman; Melvin J. Scolnick

[57] ABSTRACT

A system for automatically (where possible) converting hard copy paper mail into electronic mail, while allowing those already using computers to communicate with those in the paper domain. The system automates the process of distributing incoming mail within a building and between locations. The apparatus of this invention utilizes paper handling machines, while integrating the paper handling machines with electronic networks.

16 Claims, 3 Drawing Sheets

INTERNAL MAIL DISTRIBUTION SYSTEM

FIELD OF THE INVENTION

The invention relates generally to the field of mail delivery systems and more particularly to systems for delivering mail of various types.

From the dawn of civilization people have communicated with each other by exchanging written messages. Couriers originally delivered messages from the sender of the message to the receiver of the message. As time progressed Postal Services were developed for the delivery of letters and/or packages.

Mailing systems have been developed for handling high volumes of mail. These systems normally include an inserter for generating the mail piece, a scale for weighing each mail piece, and a computer that communicates with the scale for the purpose of determining postage. Some times mailers generate the mail piece in one city, where the mailer is located, and mail the mail piece from another city, that has a more prestigious address. One way of accomplishing the foregoing is by a system called drop mailing. In a drop mailing system, the mail pieces would be generated in one location, placed in a bag and transported to another location where they would be mailed.

Facsimile machines, that utilize the telephone network, have been developed to transmit information from one facsimile machine to another. Computers that utilize modems and the telephone network have been developed to transmit information from one computer to another.

Currently, individuals and companies are receiving and transmitting various types of mail. The mail may be received and delivered by the postal service, private mail carriers, facsimile machines and/or computers. The speed in which different types of mail are delivered varies. Everyone is not capable of receiving all of the aforementioned types of mail i.e., they do not have a facsimile machine or a computer.

A disadvantage of the prior art is that even in locations with the ability to transmit and receive mail from the foregoing sources, individuals at these locations still receive and transmit a large amount of slow moving paper or conventional mail.

SUMMARY OF THE INVENTION

This invention overcomes the disadvantages of the prior art by providing a system for automatically (where possible) converting hard copy paper mail into electronic mail, while allowing those already using computers to communicate with those in the paper domain. The system automates the process of distributing incoming mail within a building, outgoing and between locations. The apparatus of this invention utilizes paper handling machines, while integrating the paper handling machines with electronic networks.

An additional advantage of this invention is that in a drop mailing system, the mail pieces would be composed in one location, electronically transmitted to another location where they would generated and mailed.

DETAILED DESCRIPTION OF THE PREFERRED EMBODIMENT

Figure 1:
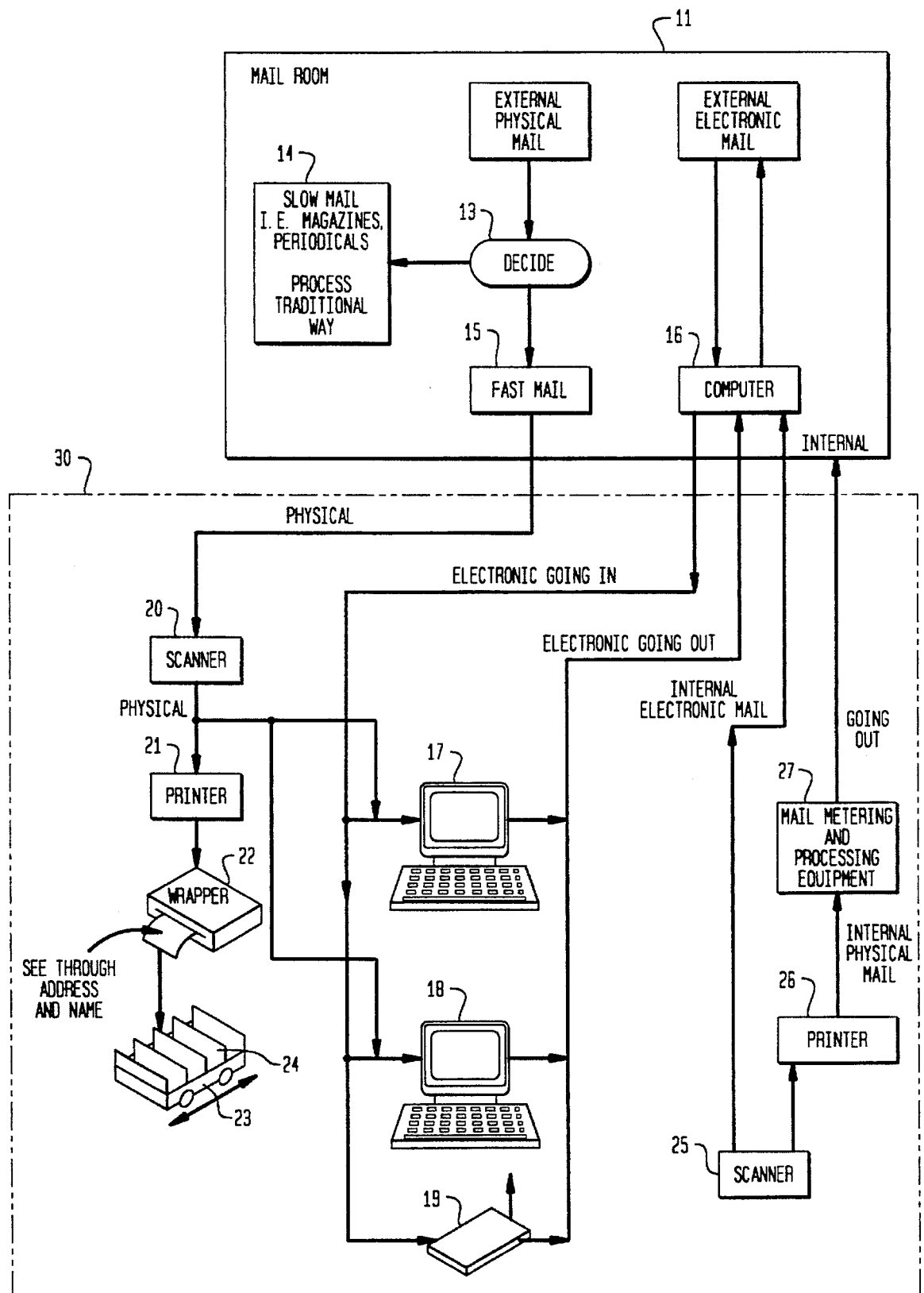
FIG. 1 is a drawing showing the manner in which mail is received and transmitted at a hub.

Referring now to the drawings in detail, and more particularly to FIG. 1 the reference character 11 represents a communications hub or mail room that may be located in a building. Mail room 11 will receive conventional mail. The conventional mail consists of packages, letters, magazines, newspapers, advertisements, etc. In block 13 the mail room will decide which pieces of the incoming mail will be processed as slow mail and which pieces of the incoming mail will be processed as fast mail. Incoming packages, magazines, newspapers, advertisements, and other junk mail will be processed in the traditional way in block 14 as slow mail. Incoming letters will be processed in block 15 as fast mail. Externally transmitted electronic mail will be received by computer 16. Computer 16 will read the incoming messages and transmit them to individual personal computers 17, work stations 18 or facsimile machines 19.

The fast letter mail will be scanned by scanner 20. If the individual to whom the mail is addressed has a personal computer 17, a work station 18 or a facsimile machine 19, scanner 20 will transmit the electronically scanned letter to personal computer 17, work station 18 or facsimile machine 19. In the event the individual to whom the mail is addressed does not have a personal computer 17, a work station 18 or a facsimile machine 19, scanner 20 will transmit the electronically scanned letter to printer 21. Printer 21 will print the letter. The letter may be wrapped and placed in a plastic file folder by wrapper 22 and filed in a movable document storage bin 23. Storage bin 23 has a plurality of slots 24, wherein a particular slot 24 may be assigned to an individual. The individual to whom the letter was addressed may go to storage bin 23 and obtain the letter. Alternatively, instead of using bin 23 the letter printed by printer 21 may be delivered by personnel in the mail room. It will be obvious to one skilled in the art that any number of personal computers 17, work stations 18, facsimile machines 19, printers 21, wrappers 22 and bins 23 may be utilized.

Material that is internally generated by personal computers 17 and work stations 18 may be electronically transmitted via computer 16. Internally generated material may also be transmitted electronically via facsimile machines 19 and computer 16 or directly by facsimile machines 19. Another method for generating internal electronic mail would be to have scanner 25 electronically read a document, transmit the electronic message to computer 16 and have computer 16 electronically transmit the message.

Internally generated physical mail may be printed by printer 26 and conveyed to mail metering and processing equipment 27. Equipment 27 folds the printed material received from printer 26 and stuffs the printed material into an envelope. Equipment 27 then weighs the envelope to determine the amount of postage that is due and prints the correct amount of postage on the envelope. Equipment 27 may be the Paragon Mail Processing Machine manufactured by Pitney Bowes. Other internally generated mail pieces may be metered by equipment 27. The internally generated mail pieces are forwarded to mail room 12 and subsequently delivered to the postal service or sent electrically to locations to receive it digitally. It will be obvious to one skilled in the art that any number of scanners 25, printers 26 and mail metering and processing equipment 27 may be utilized.

Personal computers 17, work stations 18, facsimile machines 19 scanner 20, printer 21, wrapper 22, bin 23, scanner 25, printer 26 and metering and processing equipment 27 are contained in building 30. Mail room 11 may also be contained in building 30.

Figure 2:
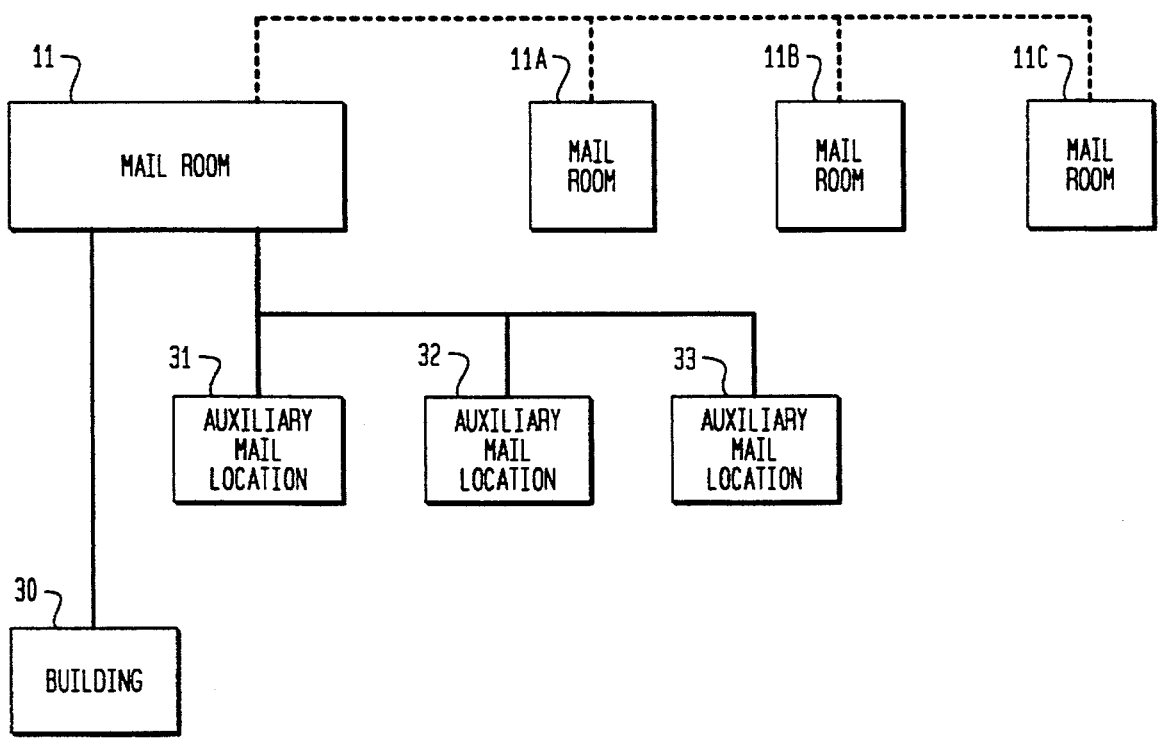
FIG. 2 is a block diagram showing the interconnection of a plurality of auxiliary mail locations with mail room 11.

FIG. 2 is a block diagram showing the interconnection of a plurality of auxiliary mail locations 31, 32 and 33 with mail room 11. Other mail rooms can be connected to the network i.e., 11A, 11B, 11C etc. Locations 31, 32 and 33 are located in different buildings and may contain all of the equipment contained in building 30 excluding mail room 11. Locations 31, 32 and 33 are coupled to mail room 11. There is no theoretical limit to the number of mail locations that may be coupled to mail room 11.

Figure 3:
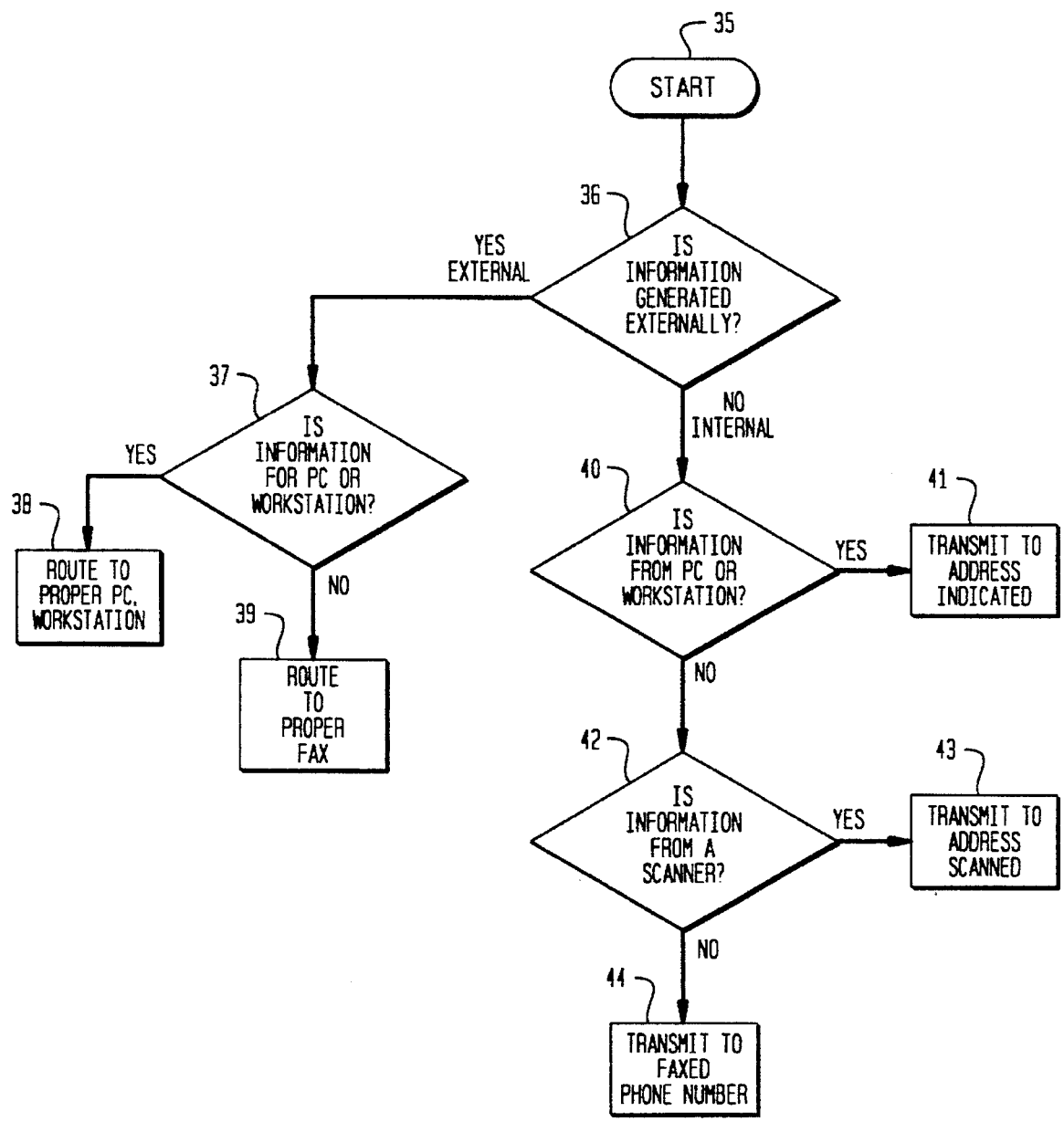
FIG. 3 is a flow chart of a program contained in computer 16.

FIG. 3 is a flow chart of a program contained in computer 16. The program starts in block 35. Then, the program goes to decision block 36. In block 36 the program decides if the incoming information is externally generated. If the information was externally generated the program proceeds to decision block 37. In block 37 the program decides whether or not the incoming information is intended for personal computer 17 or work station 18 (FIG. 1). If the incoming information is intended for personal computer 17 or work station 18 then goes to block 38. Block 38 routes the incoming information to the correct personal computer 17 or work station 18. in the event, that the incoming information in block 37 was not intended for personal computer 17 or work station 18, then and in that event the incoming information is sent to block 39. Block 39 routes the incoming information to the correct facsimile machine 19.

If the program determined in decision block 36 that the information was not externally generated, then the program would proceed to decision block 40. In block 40 the program decides whether or not the internally generated information is being transmitted from personal computer 17 or work station 18. If the incoming information was transmitted by personal computer 17 or work station 18, the program will proceed to block 41. In block 41 the program will transmit the incoming information to the destination indicated by personal computer 17 or work station 18.

If the program determined in decision block 40 that the information was not transmitted from personal computer 17 or work station 18, then the program would proceed to decision block 42. In block 42 the program decides whether or not the internally generated information is being transmitted from scanner 25. If the incoming information was transmitted from scanner 25, the program will proceed to block 43. In block 43, the program will transmit the incoming information to the destination indicated by scanner 25.

If the program determined in decision block 42 that the information was not transmitted from scanner 25, then the program would proceed to block 44. In block 44, the program will transmit the incoming information to the telephone number indicated by facsimile machine 19.

The above specification describes a new a system for automatically (where possible) converting hard copy paper mail into electronic mail, while allowing those already using computers to communicate with those in the paper domain. It is realized that the above description may indicate to those skilled in the art additional ways in which the principles of this invention may be used without departing from the spirit. It is, therefore, intended that this invention be limited only by the scope of the appended claims.

What is claimed is:

1. A method for distributing physically generated and electronically generated mail, said method including the steps of:
    receiving externally generated physical mail;
    sorting the externally generated physical mail to determine which mail is going to be electronically transferred and which mail is going to be physically delivered;
    converting the externally generated physical mail that was sorted to be electronically transferred into an electronic format;
    transmitting the externally generated physical mail in a electronic format;
    converting the externally generated physical mail in an electronic format into a human recognizable format;
    physically delivering the externally generated physical mail that was sorted to be physically delivered;
    receiving externally generated electronic mail;
    routing the electronically generated electronic mail;
    creating internal electronic mail;
    routing internal electronic mail;
    determining which internally generated physical mail is going to be electronically transferred and which mail is going to be physically delivered;
    converting the internally generated physical mail that was determined to be electronically transferred into an electronic format;
    transmitting the internally generated physical mail that was determined to be electronically transferred into a electronic format;
    converting the internally generated physical mail that was determined to be physically transferred into a human recognizable format; and
    processing the internally generated physical mail that was determined to be physically transferred.

2. The method claimed in claim 1, wherein the step of converting the physical mail that was sorted to be electronically transferred includes the step of scanning the physical mail.

3. The method claimed in claim 1, wherein the step of converting the physical mail in an electronic format into a human recognizable format includes the step of printing the physical mail.

4. The method claimed in claim 1 wherein the step of converting the physical mail that was determined to be electronically transferred into an electronic format includes the step of scanning the physical mail.

5. The method of claim 1, wherein the step of: transmitting the physical mail in a electronic format includes transmitting the mail to one or more personal computers.

6. The method of claim 1, wherein the step of: transmitting the physical mail in a electronic format includes transmitting the mail to one or more work stations.

7. The method of claim 1, wherein the step of: transmitting the physical mail in a electronic format includes transmitting the mail to one or more facsimile machines.

8. The method of claim 1, further including the steps of: transmitting and receiving physical and electronic mail between hubs.

9. The method of claim 1, further including the step of transmitting and receiving physical and electronic mail between mail rooms.

10. The method claimed in claim 1, wherein the step of physically delivering the physical mail that was sorted to be physically delivered includes the step of placing the mail in a movable bin containing a plurality of slots.

11. The method claimed in claim 10, wherein the step of placing the mail in a movable bin with a plurality of slots includes the step of placing an individuals mail in a assigned bin.

12. The method claimed in claim 1 wherein the step of converting the physical mail that was determined to be physically transferred into a human recognizable format includes the step of printing the mail.

13. The method claimed in claim 12, further includes the step of: inserting the physical mail into an envelope.

14. The method claimed in claim 13, further includes the step of: addressing the envelope.

15. The method claimed in claim 14, further including the step of: determining the postage due on the envelope.

16. The method claimed in claim 15, further including the step of: placing a postal indicia on the envelope.

\* \* \* \* \*